US009553307B2

(12) United States Patent
Lee et al.

(10) Patent No.: US 9,553,307 B2
(45) Date of Patent: Jan. 24, 2017

(54) NEGATIVE ACTIVE MATERIAL, NEGATIVE ELECTRODE, AND LITHIUM BATTERY

(71) Applicant: SAMSUNG SDI CO., LTD., Yongin-si, Gyeonggi-do (KR)

(72) Inventors: Su-Kyung Lee, Yongin-si (KR); So-Ra Lee, Yongin-si (KR); Kyu-Nam Joo, Yongin-si (KR); Yu-Jeong Cho, Yongin-si (KR); Ui-Song Do, Yongin-si (KR); Chang-Su Shin, Yongin-si (KR); Ha-Na Yoo, Yongin-si (KR); Sang-Eun Park, Yongin-si (KR); Jae-Myung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 197 days.

(21) Appl. No.: 14/151,599

(22) Filed: Jan. 9, 2014

(65) Prior Publication Data

US 2014/0234710 A1    Aug. 21, 2014

(30) Foreign Application Priority Data

Feb. 15, 2013    (KR) ........................ 10-2013-0016590

(51) Int. Cl.
| | |
|---|---|
| *H01M 4/38* | (2006.01) |
| *H01M 4/583* | (2010.01) |
| *H01M 4/133* | (2010.01) |
| *H01M 4/134* | (2010.01) |
| *H01M 4/36* | (2006.01) |

(Continued)

(52) U.S. Cl.
CPC ............ *H01M 4/366* (2013.01); *H01M 4/133* (2013.01); *H01M 4/134* (2013.01); *H01M 4/386* (2013.01); *H01M 4/583* (2013.01); *H01M 4/587* (2013.01); *H01M 4/626* (2013.01);

(Continued)

(58) Field of Classification Search
None
See application file for complete search history.

(56) References Cited

U.S. PATENT DOCUMENTS

2008/0246020 A1* 10/2008 Kawashima ........... B82Y 10/00
                                                                         257/24
2009/0000192 A1    1/2009 Norton et al.

(Continued)

FOREIGN PATENT DOCUMENTS

| KR | 10-2007-0086981 A | 8/2007 |
|---|---|---|
| KR | 10-2008-0035581 A | 4/2008 |
| WO | WO 2011/041468 * | 4/2011 |

OTHER PUBLICATIONS

Galopin et al., "Silicon Nanowires Coated with Silver Nanostructures as Ultrasenstive Interfaces for Surface-Enhanced Raman Spectroscopy," Applied Materials and Interfaces, 1 (7), Jun. 2009, 1396-1403.*

(Continued)

*Primary Examiner* — Jonathan Crepeau
(74) *Attorney, Agent, or Firm* — Lewis Roca Rothgerber Christie LLP (57) ABSTRACT

A negative active material includes a conductive unit bound in island-like form to silicon-based nanowires on a carbonaceous base. Such negative active material may improve the electrical conductivity of the silicon-based nanowires, and suppress separation of the silicon-based nanowires caused from volume expansion, and thus may improve lifetime characteristics of a lithium battery.

20 Claims, 6 Drawing Sheets

(51) Int. Cl.
- H01M 4/587 (2010.01)
- H01M 4/62 (2006.01)
- H01M 10/052 (2010.01)
- H01M 4/02 (2006.01)

(52) U.S. Cl.
CPC .... *H01M 10/052* (2013.01); *H01M 2004/021* (2013.01); *Y02E 60/122* (2013.01); *Y02T 10/7011* (2013.01)

(56) References Cited

U.S. PATENT DOCUMENTS

| | | | |
|---|---|---|---|
| 2009/0214944 A1* | 8/2009 | Rojeski | H01M 4/131 429/142 |
| 2010/0297502 A1 | 11/2010 | Zhu et al. | |
| 2012/0282540 A1 | 11/2012 | Niu et al. | |

OTHER PUBLICATIONS

Zhang et al., "Organosulfur-Functionalized Au, Pd, and Au—Pd Nanoparticles on 1D Silicon Nanowire Substrates: Preparation and XAFS Studies," Langmuir 21, Aug. 2005, 8502-8508.*

Peng et al., "Platinum Nanoparticle Decorated Silicon Nanowires for Efficient Solar Energy Conversion," Nano Letters 9 (11), Oct. 2009, 3704-3709.*

* cited by examiner

NEGATIVE ACTIVE MATERIAL, NEGATIVE ELECTRODE, AND LITHIUM BATTERY

CROSS-REFERENCE TO RELATED APPLICATION

This application claims priority to and the benefit of Korean Patent Application No. 10-2013-0016590, filed on Feb. 15, 2013, in the Korean Intellectual Property Office, the entire content of which is incorporated herein by reference.

BACKGROUND

1. Field

The following description relates to a negative active material, a negative electrode including the same, and a lithium battery including the negative electrode.

2. Description of the Related Art

Lithium secondary batteries used in portable electronic devices for information communication, such as personal data assistants (PDAs), mobile phones, and laptop computers, electric bicycles, electric vehicles, and the like, have a higher discharge voltage that is about twice or more than existing batteries, and thus exhibit a high energy density.

A lithium battery includes a positive electrode and a negative electrode, each including an active material that allows intercalation and deintercalation of lithium ions, and an organic electrolyte or a polymer electrolyte filling the gap between the negative and positive electrodes. Lithium batteries produce electrical energy from redox reactions that take place as lithium ions are intercalated into or deintercalated from the positive electrode and negative electrode.

Lithium-transition metal oxides, such as lithium cobalt oxide ($LiCoO_2$), lithium nickel oxide ($LiNiO_2$), or lithium nickel cobalt manganese oxide ($Li[NiCoMn]O_2$, $Li[Ni_{1-x-y}Co_xM_y]O_2$), having a structure for allowing intercalation of lithium ions may be used as positive active materials for lithium secondary batteries.

Carbonaceous materials in various forms, such as artificial graphite, natural graphite or hard carbon, which allow intercalation and deintercalation of lithium ions, and non-carbonaceous materials, such as silicon (Si), have been studied for use as negative electrode active materials.

Such non-carbonaceous materials exhibit a capacitance density ten times or greater than that of graphite. However, poor electrical conductivity of non-carbonaceous materials and the volumetric expansion and shrinkage during charging and discharging of the lithium secondary battery may deteriorate the capacity retention rate, charge/discharge efficiency, and lifetime characteristics of a battery using the non-carbonaceous materials.

Therefore, there is a desire for the development of high-performance negative active materials with improved electrical conductivity and improved cycle lifetime characteristics.

SUMMARY

One or more aspects of embodiments of the present invention are directed toward a negative active material with improved electric conductivity and improved lifetime characteristics.

One or more aspects of embodiments of the present invention are directed toward a negative electrode employing the negative active material.

One or more aspects of embodiments of the present invention are directed toward a lithium battery including the negative electrode.

Additional aspects will be set forth in part in the description which follows and, in part, will be apparent from the description, or may be learned by practice of the presented embodiments.

According to one or more embodiments, a negative active material includes: at least one silicon-based nanowire disposed on a carbonaceous base; and a conductive unit bound in island-like form to the silicon-based nanowire.

The conductive unit may include at least one of a metal and a metal oxide.

The conductive unit may include at least one selected from among tin (Sn), nickel (Ni), copper (Cu), platinum (Pt), ruthenium (Ru), iron (Fe), cobalt (Co), gold (Au), chromium (Cr), molybdenum (Mo), tungsten (W), manganese (Mn), technetium (Tc), rhenium (Re), osmium (Os), rhodium (Rh), iridium (Ir), palladium (Pd), silver (Ag), zinc (Zn), aluminum (Al), and alloys and oxides thereof.

The conductive unit in island-like form may have an average diameter from about 1 nm to about 1000 nm.

The conductive unit may be an aggregate of a plurality of units in island-like form.

The conductive unit may be bound to the silicon nanowire to cover an external surface of the carbonaceous base.

The conductive unit may be bound to the silicon nanowire to cover at least about 1% of the area of the external surface of the carbonaceous base.

The conductive unit may be bound with a nano-sized particle.

An amount of the conductive unit may be from about 0.1 parts to about 30 parts by weight based on 100 parts by weight of the negative active material.

The carbonaceous base may be spherical.

The carbonaceous base may have a circularity from about 0.2 to about 1.0, and in some embodiments, from about 0.7 to about 1.0, or from 0.8 to about 1.0, and in some other embodiments, from about 0.9 to about 1.0.

The carbonaceous base may include pores and have a porosity of from about 5 volume % to about 30 volume % based on a total volume of the carbonaceous base.

The carbonaceous base may include a crystalline carbonaceous material.

The crystalline carbonaceous material may include at least one of natural graphite, artificial graphite, expandable graphite, graphene, carbon black, fullerene soot, and a combination thereof.

The carbonaceous base may have an average particle diameter of from about 1 μm to about 30 μm.

The silicon-based nanowire may include at least one material selected from among Si, $SiO_x$ ($0<x<2$), a Si—Z alloy (wherein Z is an alkali metal, an alkali earth metal, a Group 13 element, a Group 14 element, a transition metal, a rare-earth metal, or a combination thereof, and is not Si), and a combination thereof. For example, the silicon-based nanowire may be a Si nanowire.

The silicon-based nanowire may have a diameter of from about 10 nm to about 500 nm, and a length of from about 0.1 μm to about 100 μm.

The silicon-based nanowire may be directly grown on the carbonaceous base. The silicon-based nanowire may be grown in the presence or absence of at least one metal catalyst selected from among Pt, Fe, Ni, Co, Au, Ag, Cu, Zn, and Cd.

An amount of the carbonaceous base may be from about 60 wt % to about 99 wt %, and an amount of the silicon-based nanowire may be from about 1 wt % to about 40 wt %, each based on a total weight of the carbonaceous base and the silicon-based nanowire.

According to one or more embodiments, a negative electrode includes any of the above-defined negative active materials.

According to one or more embodiments, a lithium battery includes the negative electrode which includes the above-defined negative active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to an embodiment, a negative active material includes: at least one silicon-based nanowire disposed on a carbonaceous base; and a conductive unit attached to the silicon-based nanowire, the conductive unit having an island shape.

Figure 1A:
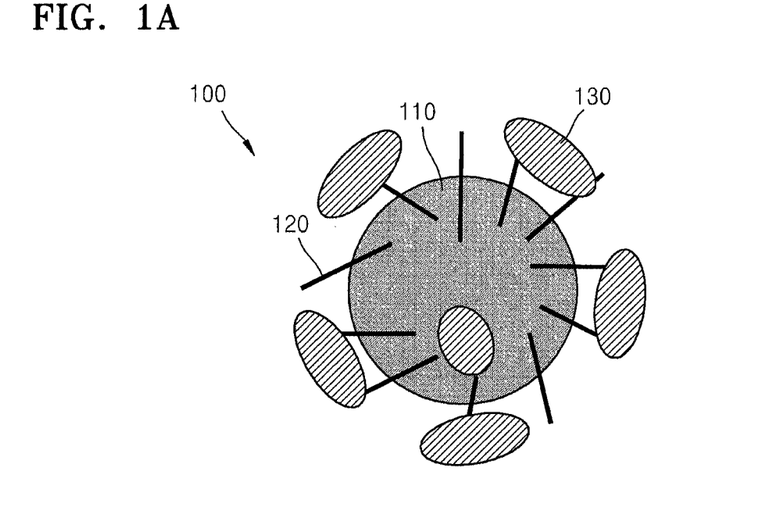
FIG. 1A is a schematic view illustrating a structure of a negative active material according to an embodiment.
Figure 1B:
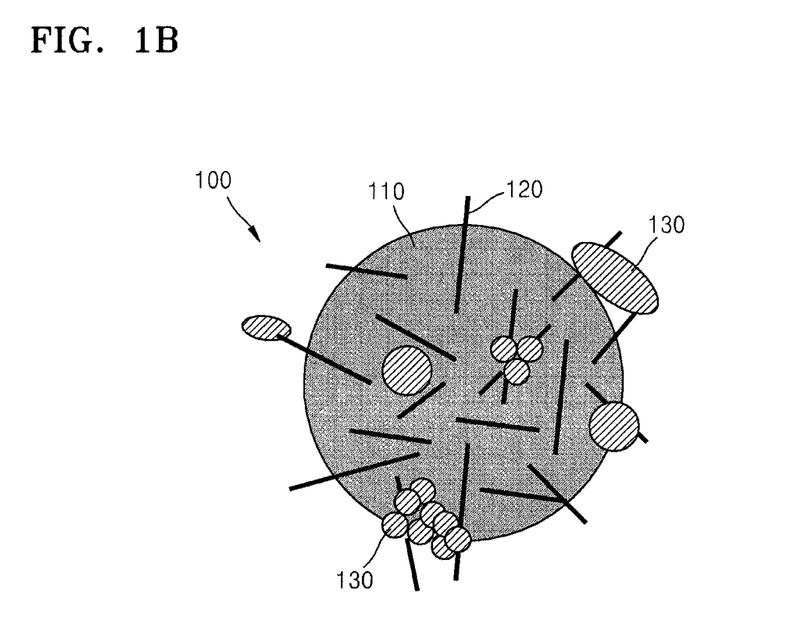
FIG. 1B is a schematic view illustrating a structure of a negative active material according to another embodiment.

FIG. 1 is a schematic view illustrating a structure of a negative active material 100 according to an embodiment. Referring to FIG. 1, the negative active material 100 has a structure with silicon-based nanowires 120 disposed on a surface of a carbonaceous base 110 and conductive units 130 bound in an island form to the silicon-based nanowires 120.

The carbonaceous base 110 may have a spherical shape. As used herein, the term "spherical" used to define the shape of the carbonaceous base 100 refers to that at least part of the carbonaceous base 110 has a gently or sharply curved appearance. The carbonaceous base 110 may have a completely spherical shape, or may have an incompletely spherical shape, or may have an elliptical shape. In one embodiment, the carbonaceous base 110 has an uneven surface with protrusions and recesses.

A degree of roundness of the spherical carbonaceous base 110 may be measured as circularity. Circularity is a measure of a degree of deviation from a perfect or ideal sphere, which may range from about 0 to 1.0. The nearer to 1.0, the closer to the ideal sphere. The carbonaceous base 110 may have a circularity of from about 0.2 to 1.0. For example, the carbonaceous base 110 may have a circularity of from about 0.7 to about 1.0, and in some embodiments, of from about 0.8 to about 1.0, and in some other embodiments, of from about 0.9 to about 1.0.

The spherical carbonaceous base 110 may be a factor in determining the shape of primary particles of a negative active material. The spherical carbonaceous base 110 may not be oriented in a particular direction when pressed to form a shape (i.e., during press-molding), unlike planar, flat, or bulk carbonaceous cores, and may be advantageous in terms of discharge characteristics or low-temperature characteristics. The spherical carbonaceous base 110 may be less reactive to electrolyte due to having a small specific surface area, and thus may improve cycle characteristics of a battery.

The term "carbonaceous" refers to the inclusion of at least about 50 wt % of carbon. For example, the carbonaceous base 110 may include at least about 60 wt %, about 70 wt %, about 80 wt %, or about 90 wt % of carbon, and in some embodiments, about 100 wt % of carbon.

In some other embodiments, the carbonaceous base 110 may include a crystalline carbonaceous material as a carbon component. The term "crystalline" refers to the inclusion of at least 50 wt % of carbon having a hexagonal crystal lattice structure in which carbon atom forming $sp^2$ hybrid orbital is covalently bound with three carbon atoms. For example, the crystalline carbonaceous material may include about 60 wt %, about 70 wt %, about 80 wt %, or about 90 wt % of carbon, and in some embodiments, about 100 wt % of carbon, having a hexagonal crystal lattice structure. The hexagonal crystal lattice structure may form a single layer or multi-layer structure, or may have any of various suitable structures, for example, a 2-dimensional structure that is bent or rolled, or has a partial defect. For example, a plurality of hexagonal crystal lattice structures may be connected to each other like a soccer ball. The crystalline carbonaceous material may have any suitable crystalline structure and not a specific crystalline structure, provided that it allows reversible intercalation and deintercalation of lithium ions during charging and discharging. The crystalline carbonaceous material may have a plane interval (d002) of the plane (002) of from 0.333 nm or greater to less than 0.339 nm, and in some embodiments, from 0.335 nm or more to less than 0.339 nm, and in some other embodiments, from 0.337 nm or more to 0.338 nm or less, as measured by X-ray diffraction.

Non-limiting examples of the crystalline carbonaceous material are natural graphite, artificial graphite, expandable graphite, graphene, carbon black, fullerene soot, and combinations thereof.

Examples of natural graphite, which is naturally occurring graphite, are flake graphite, high-crystalline graphite, and microcrystalline or cryptocrystalline (amorphous) graphite. Examples of artificial graphite, which is artificially synthesized by heating amorphous carbon at a high temperature, are primary graphite, electrographite, secondary graphite, and graphite fiber. Expandable graphite is graphite with vertically expanded molecular layers obtained by intercalating a chemical compound, such as acid or alkali, between the molecular layers of the graphite and heating the same. Graphene is single-layered graphite. The carbon black is a crystalline material less ordered as compared with graphite. The carbon black may change into graphite if heated at about 3,000° C. for a long time. The fullerene soot is a carbon mixture including at least 3 wt % of fullerene as a polyhedral bundle compound having 60 or more carbon atoms. The carbonaceous base 110 may include one of these crystalline carbonaceous materials alone or at least two thereof. For example, the natural graphite may be used in order to obtain a composition with a higher density in preparing a negative electrode.

In one embodiment, the spherical carbonaceous base 110 may be prepared by spheroidizing treatment of these crystalline carbonaceous materials. For example, a spherical carbonaceous base obtained by spherical-processing graphite may have a microstructure including curved or bent layers of graphite or a plurality of curved or bent scale-like graphite flakes.

In some embodiments, the carbonaceous base 110 may include pores incorporated during the spheroidizing treatment. The pores in the carbonaceous base 110 may alleviate volume expansion of the silicon-based nanowires 120 during charging and discharging. For example, the carbonaceous base 110 may have a porosity of from about 5% to about 30%, and in some embodiments, of from about 10% to about 20%, with respect to a total volume of the carbonaceous base 110.

An average particle diameter of the carbonaceous base 110 is not particularly limited. When the average particle diameter of the carbonaceous base 110 is too small, reactivity to an electrolyte solution is so high that it lowers the cycling characteristics. When the average particle size of the carbonaceous base 110 is too large, a negative electrode slurry may have lower dispersion stability, so that the negative electrode may have a rough surface. For example, the carbonaceous base 110 may have an average particle diameter from about 1 μm to about 30 μm, and in some embodiments, from about 5 μm to about 25 μm, and in some other embodiments, from about 10 μm to about 20 μm.

The carbonaceous base 110 may serve as a support for the silicon-based nanowires 120 disposed thereon, and suppress a volumetric change of the silicon-based nanostructure during charging/discharging.

The silicon-based nanowire 120 is disposed on the carbonaceous base 110. The term "silicon-based" refers to the inclusion of about 50 wt % or greater of Si, for example, at least about 60 wt %, about 70 wt %, about 80 wt %, about 90 wt %, or about 100 wt % of Si. The term "nanowire" refers to a wire structure with a cross-sectional diameter in nanometers. For example, the nanowire may have a cross-sectional diameter from about 10 nm to about 500 nm, a length from about 0.1 μm to about 100 μm, and an aspect ratio (of length to width) of about 10 or greater, and in some embodiments, about 50 or greater, and in some other embodiments, about 100 or greater. The nanowire may have a substantially constant diameter or a varying diameter. The major axis of the nanowire may be at least partially straight, curved, bent, or branched. The silicon-based nanowire 120 may effectively absorb a volumetric change from the charging/discharging of a lithium battery.

The silicon-based nanowire 120 may be any of a variety of suitable silicon-based materials, for example, a material selected from among Si, SiOx (0<x<2), a Si—Z alloy (wherein Z is an alkali metal, an alkali earth metal, a Group 13 element, a Group 14 element, a transition metal, a rare-earth metal, or a combination thereof, and is not Si), and a combination thereof. The element Z may be selected from the group consisting of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, Po, and a combination thereof. The silicon-based material, such as Si, SiOx, or a Si—Z alloy, may be an amorphous silicon, a crystalline silicon (either monocrystalline or polycrystalline), or combinations thereof. These silicon-based nanowires may be used alone or in a combination of at least two thereof. For example, the silicon-based nanowire may be a Si nanowire in terms of high capacity.

The silicon-based nanowire 120 may be prepared by directly growing the silicon-based nanowire 120 on a carbonaceous base 110, or by arranging previously grown silicon-based nanowires onto a carbonaceous base 110 by attaching or binding the same to the carbonaceous base 110. A method of arranging the silicon-based nanowire 120 onto the carbonaceous base 110 is not particularly limited, and may be any suitable methods. Examples of preparing the silicon-based nanowire 120 include growing silicon-based nanowires using a vapor-liquid-solid (VLS) growing method, and using a nano-sized catalyst for thermally decomposing a precursor gas supplied near to the catalyst. The silicon-based nanowire 120 may be directly grown on the carbonaceous base 110 in the presence or absence of a metal catalyst. Examples of the metal catalyst are Pt, Fe, Ni, Co, Au, Ag, Cu, Zn, and Cd.

In some embodiments, the negative active material may include an appropriate amount of the carbonaceous base that is enough to hold silicon-based nanowires for high capacity and to suppress a volumetric change of the silicon-based nanowires. For example, an amount of the carbonaceous base 110 may be from about 60 wt % to about 99 wt % based on a total weight of the carbonaceous base 110 and the silicon-based nanowire 120. An amount of the silicon-based nanowire 120 may be from about 1 wt % to about 40 wt % based on a total weight of the carbonaceous base 110 and the silicon-based nanowire 120. In one embodiment, when the amounts of the carbonaceous base 110 and the silicon-based nanowires 120 are within these ranges, the negative active material exhibits high capacity.

The conductive units 130 having an island shape are bound to the silicon-based nanowires 120 disposed on the surface of the carbonaceous base 110. The expression "island shape" may refer to a spherical, semispherical, non-spherical, or amorphous shape having a volume, but it is not limited to these specific shapes. The conductive units 130 may each be a single unit as illustrated in FIG. 1A, or an aggregate of multiple units in a volume as illustrated in FIG. 1B. The island-like conductive units 130 may include at least one conductive unit uniformly or non-uniformly distributed like islands on and bound to a sidewall or an end of at least one silicon-based nanowire. For example, the conductive unit 130 may have an island-like shape with an average diameter of from about 1 nm to about 1000 nm, and in some embodiments, of from about 10 nm to about 1000 nm, and in some other embodiments, of from about 100 nm to about 500 nm.

The conductive unit 130 may include a conductive material. In some embodiments, the conductive unit 130 may include a metal, a metal alloy, and/or a metal oxide that have electrical conductivity. For example, the conductive unit 130 may include at least one selected from among tin (Sn), nickel (Ni), copper (Cu), platinum (Pt), ruthenium (Ru), iron (Fe), cobalt (Co), gold (Au), chromium (Cr), molybdenum (Mo), tungsten (W), manganese (Mn), technetium (Tc), rhenium (Re), osmium (Os), rhodium (Rh), iridium (Ir), palladium (Pd), silver (Ag), zinc (Zn), aluminum (Al), and alloys and oxides thereof. In some other embodiments, the conductive unit 130 may include a metal, for example, Sn, Ni, or Cu, or an alloy such as NiP or NiB. These metal and metal alloys are readily available and compatible with electroless plating.

The conductive unit 130 may be a metal lump as a whole island or may be an aggregate of a plurality of nano-sized metal particles (for example, having a diameter from about 1 nm to about 50 nm, from about 1 nm to about 10 nm, or from about 1 nm to about 5 nm) physically or chemically agglomerated or bound to one another to form an island-like shape.

The conductive unit 130 may be formed by binding or depositing these metals onto the silicon-based nanowires 120 disposed on the carbonaceous base 110 by using any of a variety of suitable methods, for example, chemical vapor deposition, electrochemical deposition (for example, electroplating or electroless chemical plating), physical vapor deposition, dipping in a solution or precipitation, adsorption and desorption of colloidal particles, atomic layer deposition, or a combination of these methods.

The conductive units 130 may be bound to the silicon-based nanowires 120 by using these methods in island-like shapes to cover the surface of the carbonaceous base 110 with the silicon-based nanowires 120 thereon. For example, the conductive units 130 may be bound to the silicon-based nanowires 120 to cover at least about 1%, or at least about 1% to about 50% of the surface area of the carbonaceous base 110. Since the silicon-based nanowires 120 have a very small surface area and volume, it does not substantially increase the surface area of the carbonaceous base 110, and the volume of the silicon-based nanowires 120 is negligible in consideration of the surface of the carbonaceous base 110. The conductive units 130 may increase electrical conductivity of the negative active material that may likely be reduced due to the silicon-based nanowires 120, and thus may improve efficiency characteristics. The conductive units 130 may also hold the silicon-based nanowires 120 together (e.g., not to be separated) during charging and discharging, and thus may improve a stability and lifetime of an electrode.

An amount of the conductive unit 130 may be determined to be within a range suitable to supplement the electrical conductivity reduced by the silicon-based nanowires 120 and serve as a sufficient conduction path of negative active material particles without decreasing the electrical capacity of a battery. For example, the amount of the conductive unit 130 may be from about 0.1 parts to about 30 parts by weight, and in some embodiments, from about 1 part to about 20 parts by weight, and in some other embodiments, from about 5 parts to about 10 parts by weight, based on 100 parts by weight of the negative active material.

In some embodiments, the primary particles of the negative active material having a structure as described above may be agglomerated or bound to each other, or bound with an active material to form secondary particles.

According to another embodiment, a negative electrode includes any of the negative active materials according to the above-described embodiments.

According to another embodiment, a lithium battery includes a negative electrode including any of the negative active materials according to the above-described embodiments. For example, the lithium battery may include a negative electrode including any of the negative active materials according to the above-described embodiments, a positive electrode disposed opposite to the negative electrode, and an electrolyte disposed between the negative electrode and the positive electrode.

A negative electrode and a lithium battery including the negative electrode may be manufactured as follows:

The negative electrode including the above-described negative active material may be prepared by mixing, for example, the negative active material described above, a binder, and an optional conducting agent in a solvent to prepare a negative active material composition, and then shaping the negative active material composition in a certain shape, or coating a current collector such as a copper foil with the negative active material composition.

The binder in the negative active material composition facilitates binding between the negative active material and the optional conducting agent, and binding of the negative active material to the current collector. An amount of the binder may be from about 1 to about 50 parts by weight based on 100 parts by weight of the total weight of the negative active material. For example, the amount of the binder may be from about 1 part to about 30 parts by weight, and in some embodiments, from about 1 part to about 20 parts by weights, and in some other embodiments, from about 1 part to about 15 parts by weight, based on 100 parts by weight of the negative active material. Examples of the binder are polyvinylidene fluoride (PVDF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethylmethacrylate, polyaniline, acrylonitrile butadiene styrene, phenol resin, epoxy resin, polyethylene terephthalate, polytetrafluoroethylene, polyphenylene sulfide, polyamide imide, polyether imide, polyethylene sulfone, polyamide, polyacetal, polyphenylene oxide, polybutylene terephthalate, ethylene-propylene-diene terpolymer (EPDM), sulfonated EPDM, styrene butadiene rubber, fluoro rubber, and various copolymers.

The negative electrode may further include a conducting agent that provides a conduction path to the negative active material to further improve electrical conductivity. The conducting agent may be any suitable one for lithium batteries. Non-limiting examples of the conducting agent are carbonaceous materials, such as natural graphite, artificial graphite, carbon black, acetylene black, ketjen black, carbon fibers (for example, vapor-phase grown carbon fiber), or the like; metal-based materials, such as copper, nickel, aluminum, silver, or the like, in powder or fiber form; and conductive materials, including conductive polymers, such as a polyphenylene derivative, or a mixture thereof. The amount of the conducting agent may be appropriately adjusted. For example, a weight ratio of the negative active material to the conducting agent may be from about 99:1 to about 90:10.

Non-limiting examples of the solvent are N-methylpyrrolidone (NMP), acetone, and water. The amount of the solvent may be from about 1 part to about 10 parts by weight based on 100 parts by weight of the negative active material. In one embodiment, when the amount of the solvent is within this range, formation of the negative active material layer is facilitated.

In addition, the current collector is generally fabricated to have a thickness of about 3 to about 500 μm. The current collector is not particularly limited, and may be any suitable materials so long as they have a suitable conductivity without causing chemical changes in a fabricated battery. Examples of the current collector are copper; stainless steel; aluminum; nickel; titanium; sintered carbon; copper or stainless steel that is surface-treated with carbon, nickel, titanium, or silver; and aluminum-cadmium alloys. In addition, the negative current collector may be processed to have fine irregularities on surfaces thereof so as to enhance adhesive strength of the current collector to the negative active material, and may be used in any of various forms including films, sheets, foils, nets, porous structures, foams, and non-woven fabrics.

The negative active material composition may be coated directly on a current collector to manufacture a negative electrode plate. Alternatively, the negative electrode plate may be manufactured by casting the negative active material composition on a separate support to form a negative active material film, separating the negative active material film from the support, and laminating the negative active material film on a copper foil current collector. The negative electrode is not limited to the examples described above, and may be one of a variety of electrodes.

Alternatively, the negative active material composition may be printed on a flexible electrode substrate to manufacture a printable battery.

In order to form the positive electrode, a positive active material, a conductive material, a binder, and a solvent are mixed together to prepare a positive active material composition.

Any lithium-containing metal oxide that is commonly used in the art may be used as the positive active material. The lithium-containing metal oxide may be $LiCoO_2$, $LiMn_xO_{2x}$ (x=1, 2), $LiNi_{1-x}Mn_xO_2$ (0<x<1), or $LiNi_{1-x-y}Co_xMn_yO_2$ (0≤x≤0.5, 0≤y≤0.5). Examples of the lithium-containing metal oxide are compounds that allow intercalation and deintercalation of lithium ions, for example, $LiMn_2O_4$, $LiCoO_2$, $LiNiO_2$, $LiFeO_2$, $V_2O_5$, TiS, or MoS.

The conductive material, the binder, and the solvent used in the negative active material composition described above may also be used in a positive active material composition. If required, a plasticizer may be added to each of the positive active material composition and the negative active material composition to form pores in the electrode plates. The amounts of the positive active material, the conducting agent, the binder, and the solvent may be in ranges that are suitable in lithium batteries.

A positive electrode current collector is fabricated to have a thickness from about 3 μm to about 500 μm, and may be any suitable current collector as long as it has high conductivity without causing chemical changes in a fabricated battery. Examples of the positive electrode current collector are stainless steel, aluminum, nickel, titanium, sintered carbon, and aluminum or stainless steel that is surface-treated with carbon, nickel, titanium, or silver. The positive electrode current collector may be processed to have fine irregularities on a surface thereof so as to enhance an adhesive strength of the current collector to the positive active material. The positive electrode current collector may be in any of various suitable forms, including a film, a sheet, a foil, a net, a porous structure, a foam, and a non-woven fabric.

The positive active material composition is directly coated on the positive electrode current collector and dried to prepare the positive electrode plate. Alternatively, the positive active material composition may be cast on a separate support, and then a positive active material film separated from the support may be laminated on the positive electrode current collector to prepare the positive electrode plate.

The positive electrode and the negative electrode may be separated from each other by a separator. Any separator that is suitable for lithium batteries may be used. According to embodiments of the present invention, the separator may have low resistance to migration of ions in an electrolyte and have high electrolyte-retaining ability. Examples of the separator are glass fiber, polyester, Teflon, polyethylene, polypropylene, polytetrafluoroethylene (PTFE), and a combination thereof, each of which may be a nonwoven fabric or a woven fabric. In one embodiment, the separator may be porous and have a pore diameter of about 0.01 to about 10 μm and a thickness of about 5 to about 300 μm.

The lithium salt-containing non-aqueous electrolyte is composed of a non-aqueous electrolyte solution and a lithium salt. The non-aqueous electrolyte may be a non-aqueous liquid electrolyte, an organic solid electrolyte, or an inorganic solid electrolyte.

Non-limiting examples of the non-aqueous liquid electrolyte are aprotic organic solvents, including N-methyl-2-pyrrolidone, propylene carbonate, ethylene carbonate (EC), butylene carbonate, dimethyl carbonate, diethyl carbonate (DEC), fluoroethylene carbonate (FEC), ethylene methylene carbonate, methylpropyl carbonate, ethyl propanoate, methyl acetate, ethyl acetate, propyl acetate, dimethylether, γ-butyrolactone, 1,2-dimethoxy ethane, tetrahydroxyfuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte are polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Non-limiting examples of the inorganic solid electrolyte are nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, or $Li_3PO_4$—$Li_2S$—$SiS_2$.

The lithium salt may be any lithium salt that is soluble in the above-mentioned non-aqueous electrolyte. For example, the lithium salt may be at least one selected from among LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenylborate, and the like, and combinations thereof.

Lithium batteries may be classified as lithium ion batteries, lithium ion polymer batteries, or lithium polymer batteries, according to the type of separator and/or electrolyte included therein. In addition, lithium batteries may be classified as cylindrical battery, rectangular battery, coin battery, or pouch battery, according to the shape thereof. Lithium batteries may also be classified as either bulk battery or thin film battery, according to the size thereof. In addition, lithium primary batteries and lithium secondary batteries are available.

A method of manufacturing a lithium battery is known in the art, so a detailed description thereof is not provided.

Figure 2:
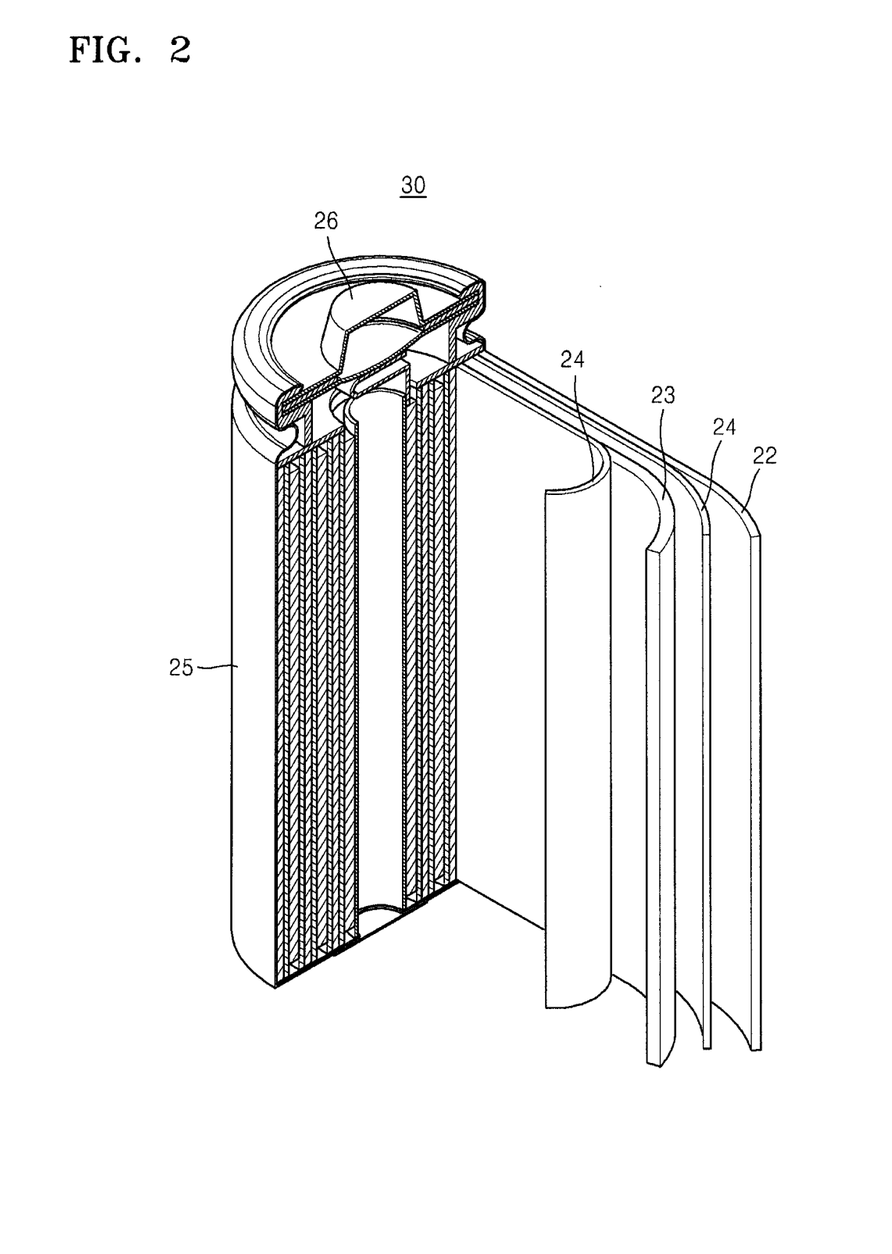
FIG. 2 is a schematic view of a structure of a lithium battery according to an embodiment.

FIG. 2 is a schematic view of a structure of a lithium battery 30 according to an embodiment.

Referring to FIG. 2, the lithium battery 30 includes a positive electrode 23, a negative electrode 22, and a separator 24 disposed between the positive electrode 23 and the negative electrode 22. The positive electrode 23, the negative electrode 22, and the separator 24 are wound or folded, and then accommodated in a battery case 25. Subsequently, an electrolyte is injected into the battery case 25, and the battery case 25 is sealed by a sealing member 26, thereby completing the manufacture of the lithium battery 30. The battery case 5 may have a cylindrical shape, a rectangular shape, or a thin-film shape. The lithium battery 30 may be a lithium ion battery.

The lithium battery may be suitable for use as power sources for electric vehicles and power tool requiring high capacity, high-power output, and operation under high temperature conditions, in addition to power sources for conventional mobile phones and portable computers, and may be coupled to conventional internal combustion engines, fuel cells, or super-capacitors to be used in hybrid vehicles. In addition, the lithium battery may be used in all applications requiring high-power output, high voltage, and operation under high temperature conditions.

Hereinafter, one or more embodiments will be described in more detail with reference to the following examples. However, these examples are not intended to limit the scope of the one or more embodiments.

Example 1

Figure 3:
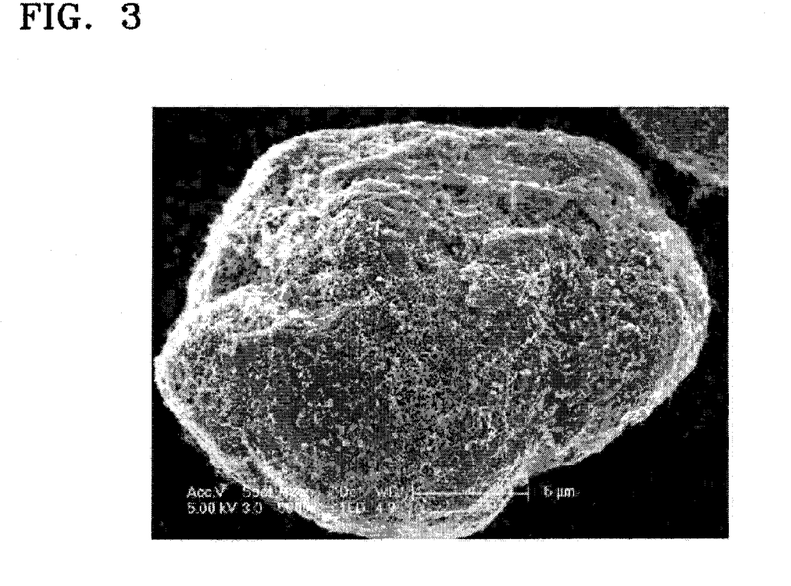
FIG. 3 is a field-emission scanning electron microscopic (FE-SEM) image of a negative active material of Example 1, including silicon nanowires grown on a surface of spherical graphite.

Silicon nanowires (SiNWs) were grown on spherical graphite (having an average particle diameter of about 10 µm available from Hitachi Chemical Co., Ltd) using a vapor-liquid-solid (VLS) growing method. Particles of the spherical graphite were randomly selected, and then analyzed using FPIA-3000 to measure circularities. As a result, the spherical graphite particles had a circularity ranging from about 0.808 to about 1.000. The grown SiNWs had an average diameter from about 30 nm to about 50 nm and an average length of about 1.5 µm. The amount of the SiNWs was about 7.15 wt % of a total weight of the spherical graphite having the SiNWs. A field-emission scanning electron microscopic (FE-SEM) image of the spherical graphite with the SiNWs grown on the surface thereof is shown in FIG. 3.

Nickel (Ni) metal was deposited on the surface of the spherical graphite with the grown SiNWs on the surface thereof via electroless plating to prepare a negative active material. In depositing the Ni metal, the spherical graphite with the grown SiNWs on the surface thereof was mixed with water through stirring to be wet, and then dipped in a $PdCl_2$ solution for catalyzing and then in a $H_2SO_4$ 20% solution for accelerating the deposition process. Afterward, the resulting product was washed once with water, and then dipped in a Ni-containing electrolyte solution while stirring. An amount of the Ni metal added in preparing the plating solution was adjusted to plate the spherical graphite with a target amount of the Ni metal. The plating solution was maintained at a temperature of about 60° C. at a pH from about 9.5 to about 10 for a complete reaction until the target amount of the Ni metal was coated, thereby obtaining the negative active material with Ni metal deposited on the SiNW-grown surface of the spherical graphite.

The negative active material and a binder (LSR7, a mixture of 23 wt % of PAI and 97 wt % of N-methyl-2-pyrrolidone, available from Hitachi Chemical Co., Ltd) were mixed in a weight ratio of about 90:10 to obtain a mixture, to which then N-methylpyrrolidone was added to adjust the viscosity of the mixture to reach a solid amount of about 30 wt % to about 50 wt %, thereby preparing a negative active material slurry. This negative active material slurry was coated on an aluminum foil current collector having a thickness of about 10 µm to form a negative electrode plate, which was then dried at about 120° C. for about 15 minutes, and then pressed, thereby manufacturing a negative electrode having a thickness of about 60 µm. Li metal as a counter electrode, a polyethylene separator having a thickness of about 20 µm (STAR20, available from Asahi), and an electrolyte were used in manufacturing a 2016R type coin cell. The electrolyte injected into the 2016R type coin cell was a solution of 0.75 M $LiPF_6$ dissolved in a mixed solvent of ethylene carbonate (EC), diethyl carbonate (DEC), ethyl propionate (EP), and fluoroethylene carbonate (FEC) in a volume ratio of about 25.3:30.7:36:8. After welding the coin cell, the coin cell was vacuum-dried at about 160° C. for about 2 hours to harden the binder and remove moisture.

Comparative Example 1

A coin cell was manufactured in the same manner as in Example 1, except that primary particles of spherical graphite with grown SiNWs on a surface thereof, not plated with metal, were used to prepare a negative active material.

Analysis of Negative Active Material

Evaluation Example 1

FE-SEM Image Analysis of Negative Active Material

The negative active material used in manufacturing the coin cell of Example 1 was analyzed at different magnifications by FE-SEM. The results are shown in FIGS. 4A to 4C.

Figure 4A:
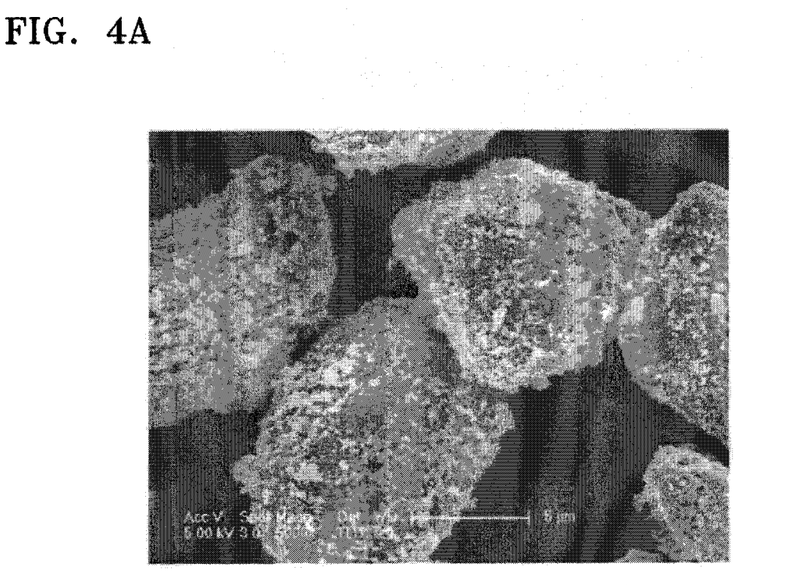
FIGS. 4A to 4C are FE-SEM images of the negative active material of Example 1 at different magnifications.
Figure 4B:
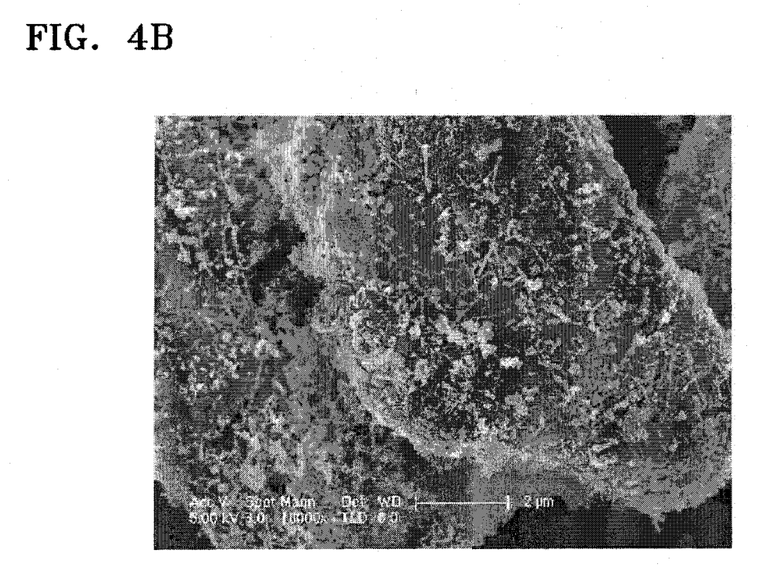
Figure 4C:
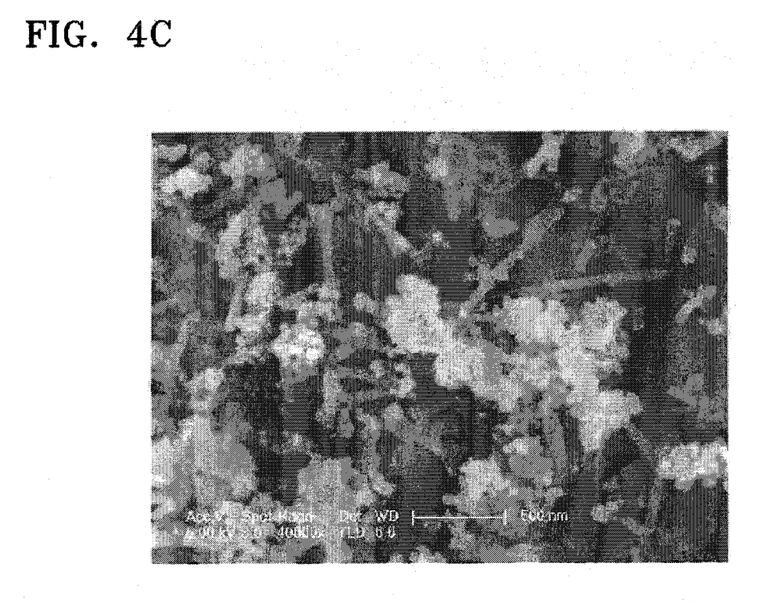

Referring to FIGS. 4A to 4C, the negative active material of Example 1 was found to have Ni metal coated in island-like form through electroless plating on the SiNWs grown on the spherical graphite.

Evaluation Example 2

Electrical Conductivity Measurement of Negative Active Material

Electrical conductivities of the negative active materials used in manufacturing the coin cells of Example 1 and Comparative Example 1 with respect to tap density of each negative active material were measured using an electrical conductivity measurement system (MCP-PD51, available from Mitsubish Chemical).

An amount of each of the negative active materials used in manufacturing the coin cells of Example 1 and Comparative Example 1 was loaded into a holder, and then pressed to obtain a pellet of about 2.040 g in mass. A distance between electrodes was about 3 mm, a radius of each of the electrodes was about 0.7 mm, and a radius of pellets was about 10 mm. Resistance (R) of a pattern at different pressures were calculated using a four-point probe method. The specific resistances and electrical conductivities of the negative active materials were calculated according to the equations below, using the resistance values and a shape correction factor to consider variations in thickness and shape of the patterns.

$$\rho = G \times R, \text{ where } G = 3.575 \times t \qquad \langle\text{Equation 1}\rangle$$

($\rho$ is specific resistance, $R$: resistance,
$G$: shape correction factor, and $t$: pattern thickness)

$$\sigma = \frac{1}{\rho} \qquad \langle\text{Equation 2}\rangle$$

($\sigma$: electrical conductivity, and $\rho$: specific resistance)

Figure 5:
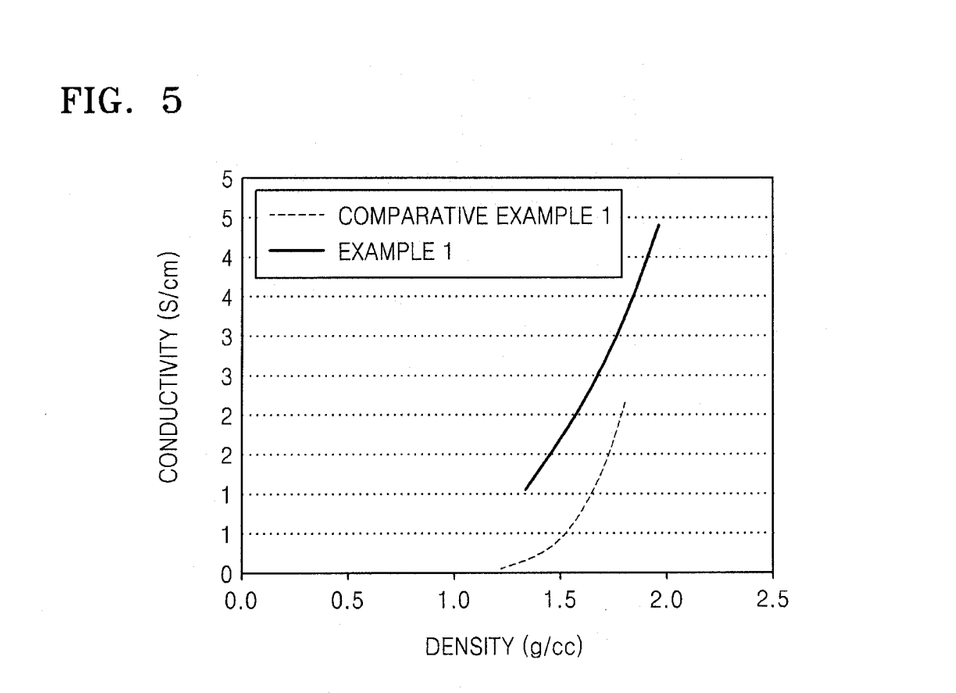
FIG. 5 is a graph illustrating the results of electrical conductivity measurements of negative active materials used to manufacture coin cells of Example 1 and Comparative Example 1.

The electrical conductivities of each negative active material were measured while increasing the tap density of the pellet. The results are shown in FIG. 5. Referring to FIG. 5, the negative active material of Example 1, including metal coated in island-like form on the SiNW, was found to have relatively high electrical conductivities, which may improve efficiency and lifetime characteristics of a battery.

Evaluation of Cell Characteristics

Evaluation Example 5

Measurement of Volume Expansion Rate of Electrode

After being charged at 0.05 C (formation process), the coin cells of Example 1 and Comparative Example 1 were disassembled to separate a negative electrode plate from each coin cell. A volume expansion rate was measured by comparing the thicknesses of the negative electrode plates before and after the charging. The results are shown in FIG. 6.

Figure 6:
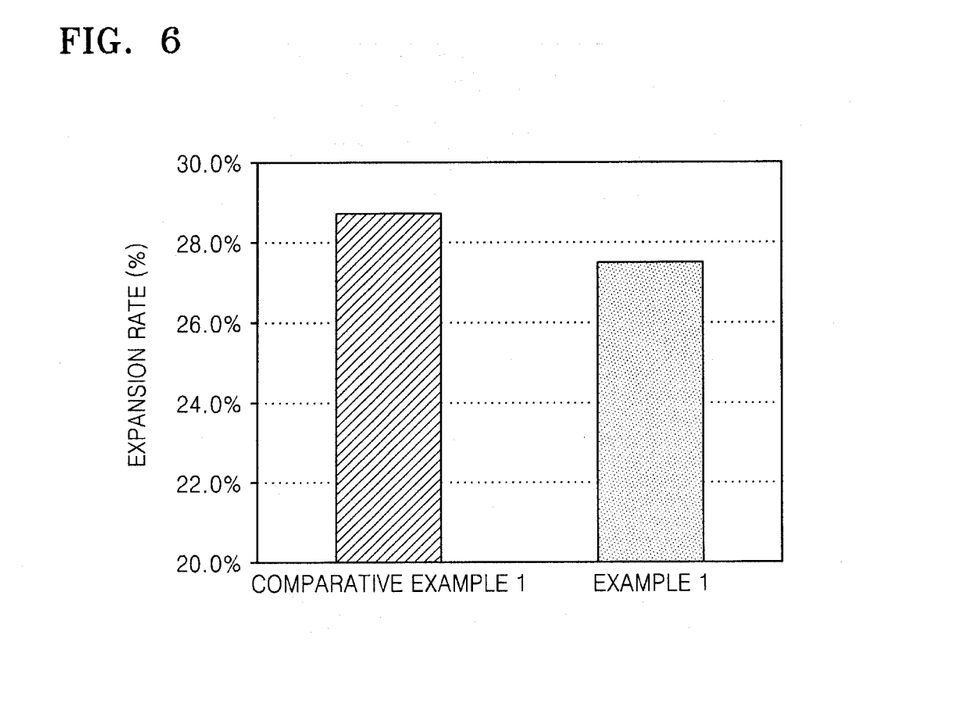
FIG. 6 is a graph illustrating the results of measuring volume expansion rates of negative electrodes of the coin cells of Example 1 and Comparative Example 1 according to charging and discharging.

Referring to FIG. 6, the negative electrode of Example 1, including the metal coated in island-like form on the SiNWs, had a relatively low volume expansion rate. This is attributed to that the metal coated in island-like form on the SiNWs suppressed expansion of the SiNWs. The low volume expansion rate may improve charge/discharge efficiency and lifetime characteristics of a battery.

Evaluation Example 6

Charge-Discharge Test

The coin cells of Example 1 and Comparative Example 1 were each charged while supplying a current of 40 mA per 1 g of the negative active material until the voltage thereof reached about 0.001 V (with respect to Li), and then discharged at the same current flow rate to a voltage of about 3 V (with respect to Li). Then, the cycle of charging and discharging was repeated 50 times at the same current flow rate in the same voltage range as those above.

The charge-discharge test was performed at about 25° C. The charge-discharge efficiency (CDE) is defined as Equation 3. The capacity retention rate (CRR) is defined as Equation 4.

Charge-discharge efficiency(CDE,%)=[Discharge capacity at each cycle/Charge capacity at each cycle]×100  <Equation 3>

Capacity retention rate(CRR,%)=[Discharge capacity at each cycle/Discharge capacity at $1^{st}$ cycle]×100  <Equation 4>

Figure 7:
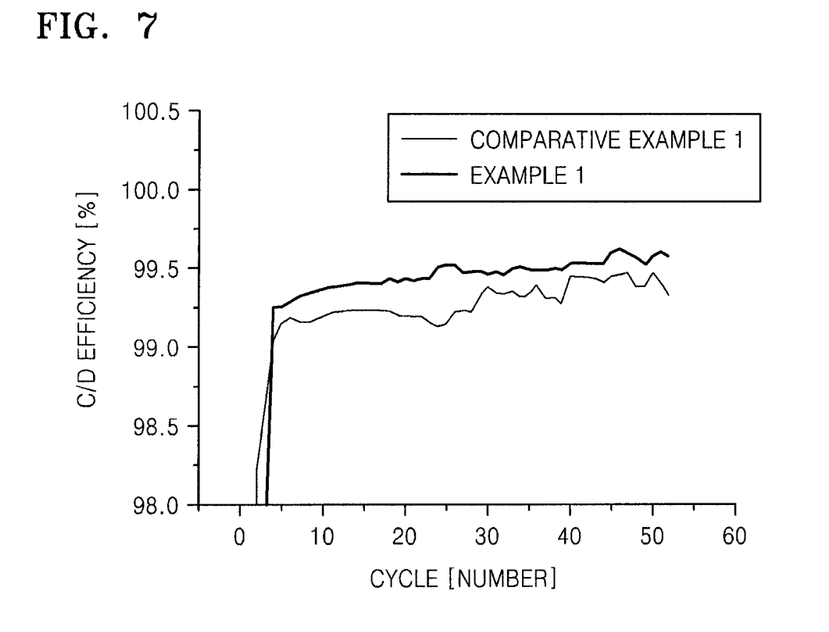
FIG. 7 is a graph illustrating the results of evaluating charge-discharge efficiencies (CDEs) of the coin cells of Example 1 and Comparative Example 1.

The results of evaluating the charge-discharge efficiencies of the coin cells of Example 1 and Comparative Example 1 are shown in FIG. 7.

Referring to FIG. 7, the negative active material of Example 1, including metal bound in island-like form to the SiNWs, was found to have a relatively higher charge-discharge efficiency. This is attributed to the increased conductivity of the negative electrode plate resulting from the bound metal, and the increased stability of the negative electrode plate with reduced volume expansion. Furthermore, the initial cycle efficiency of the coin cell of Example 1 was improved due to a reduced irreversible capacity from the binding of the metal.

Figure 8:
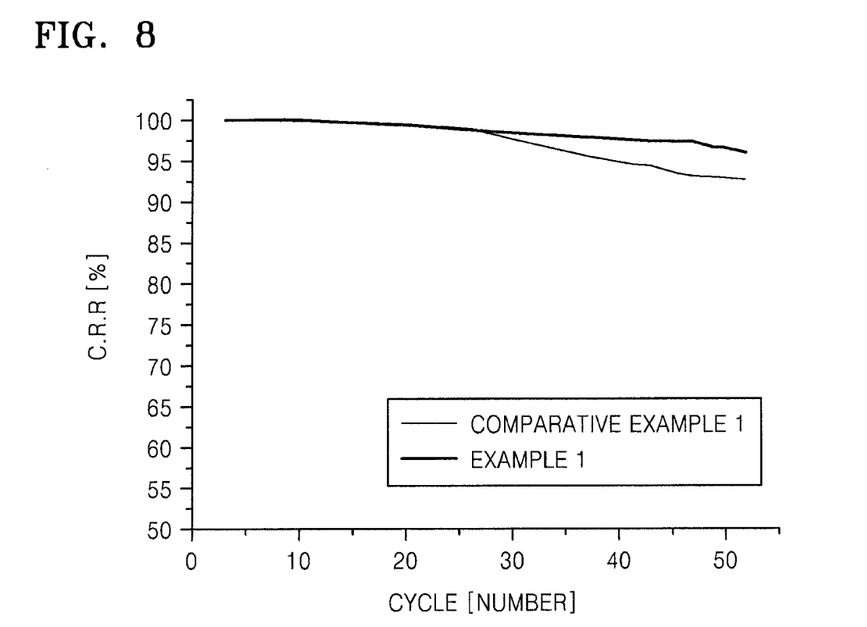
FIG. 8 is a graph illustrating the results of evaluating capacity retention rates (CRRs) of the coin cells of Example 1 and Comparative Example 1.

The results of evaluating the capacity retention rates of the coin cells of Example 1 and Comparative Example 1 are shown in FIG. 8. Referring to FIG. 8, the coin cell of Example 1, including metal bound in island-like form to the SiNWs in the negative active material, was found to have a relatively higher capacity retention rate.

Based on the results of the charge-discharge test, according to embodiments of the present invention, using the negative active material including a conductive unit bound in island-like form to the SiNWs grown on the graphite base improves the electrical conductivity of the negative electrode plate and ensures stability of the negative electrode plate through controlled volume expansion rate. Consequently, this improves high-rate characteristics and lifetime characteristics of a battery.

As described above, according to the one or more of the above embodiments, a negative active material, including a conductive unit bound in island-like form to SiNWs on a carbonaceous base, improves the electrical conductivity of the SiNWs, and suppresses separation of the SiNWs caused from volume expansion, and thus improves lifetime characteristics of a lithium battery.

It should be understood that the exemplary embodiments described herein should be considered in a descriptive sense only and not for purposes of limitation. Descriptions of features or aspects within each embodiment should typically be considered as available for other similar features or aspects in other embodiments.

While the present invention has been particularly shown and described with reference to embodiments thereof, it will be understood by those of ordinary skill in the art that various changes in form and details may be made therein without departing from the spirit and scope of the present invention as defined by the following claims and equivalents thereof.

What is claimed is:

1. A negative active material comprising:
   at least one silicon-based nanowire on a carbonaceous base; and
   a conductive unit bound to the silicon-based nanowire in island-like form,
   wherein the conductive unit comprises a material selected from the group consisting of an elemental metal, an alloy thereof, and a metal oxide, the elemental metal being selected from the group consisting of nickel (Ni), copper (Cu), platinum (Pt), ruthenium (Ru), iron (Fe), cobalt (Co), gold (Au), chromium (Cr), molybdenum (Mo), tungsten (W), manganese (Mn), technetium (Tc), rhenium (Re), osmium (Os), rhodium (Rh), iridium (Ir), palladium (Pd), silver (Ag), zinc (Zn), and aluminum (Al), and the metal of the metal oxide being selected from the group consisting of copper (Cu), platinum (Pt), ruthenium (Ru), iron (Fe), gold (Au), chromium (Cr), molybdenum (Mo), tungsten (W), technetium (Tc), rhenium (Re), osmium (Os), rhodium (Rh), iridium (Ir), palladium (Pd), silver (Ag), zinc (Zn), and aluminum (Al), wherein the carbonaceous base is spherical.

2. The negative active material of claim 1, wherein the conductive unit in island-like form has an average diameter from about 1 nm to about 1000 nm.

3. The negative active material of claim 1, wherein the conductive unit is an aggregate of a plurality of units in island-like form.

4. The negative active material of claim 1, wherein the conductive unit is attached to the silicon nanowire to cover an external surface of the carbonaceous base.

5. The negative active material of claim 4, wherein the conductive unit is attached to the silicon nanowire to cover at least about 1% of the area of the external surface of the carbonaceous base.

6. The negative active material of claim 1, wherein the conductive unit comprises a plurality of nano-sized particles which are agglomerated or bound to one another to form an island-like shape.

7. The negative active material of claim 1, wherein an amount of the conductive unit is from about 0.1 parts to about 30 parts by weight based on 100 parts by weight of the negative active material.

8. The negative active material of claim 1, wherein the carbonaceous base has a circularity from about 0.2 to 1.0.

9. The negative active material of claim 1, wherein the carbonaceous base comprises pores and has a porosity of from about 5 volume % to about 30 volume % based on a total volume of the carbonaceous base.

10. The negative active material of claim 1, wherein the carbonaceous base comprises a crystalline carbonaceous material.

11. The negative active material of claim 10, wherein the crystalline carbonaceous material comprises at least one of natural graphite, artificial graphite, expandable graphite, graphene, carbon black, fullerene soot, and a combination thereof.

12. The negative active material of claim 1, wherein the carbonaceous base has an average particle diameter of from about 1 μm to about 30 μm.

13. The negative active material of claim 1, wherein the silicon-based nanowire comprises at least one material selected from the group consisting of Si, $SiO_x$ (0<x<2), a Si—Z alloy, and combinations thereof, wherein Z is an alkali metal, an alkali earth metal, a Group 13 element, a Group 14 element, a transition metal, a rare-earth metal, or a combination thereof, and is not Si.

14. The negative active material of claim 1, wherein the silicon-based nanowire has a diameter of from about 10 nm to about 500 nm, and a length of from about 0.1 μm to about 100 μm.

15. The negative active material of claim 1, wherein the silicon-based nanowire is directly grown on the carbonaceous base.

16. The negative active material of claim 15, wherein the silicon-based nanowire is grown in the presence of at least one metal catalyst selected from the group consisting of Pt, Fe, Ni, Co, Au, Ag, Cu, Zn, Cd, and combinations thereof.

17. The negative active material of claim 1, wherein an amount of the carbonaceous base is from about 60 wt % to about 99 wt %, and an amount of the silicon-based nanowire is from about 1 wt % to about 40 wt %, each based on a total weight of the carbonaceous base and the silicon-based nanowire.

18. A negative electrode comprising the negative active material of claim 1.

19. A lithium battery comprising the negative electrode of claim claim 18.

20. The negative active material of claim 1, wherein the negative active material comprises a plurality of the silicon-based nanowires, a plurality of the conductive units, and at least one of the conductive units bonds to at least two of the silicon-based nanowires.

* * * * *